United States Patent [19]

Scott

[11] 4,212,417
[45] Jul. 15, 1980

[54] SPARE TIRE CARRIER FOR PICK-UP TRUCKS

[76] Inventor: Leroy A. Scott, R.R. #6, Paola, Kans.

[21] Appl. No.: 972,220

[22] Filed: Dec. 22, 1978

[51] Int. Cl.² .................... B62D 43/02; B62D 43/06
[52] U.S. Cl. ........................... 224/42.21; 224/42.24; 414/466
[58] Field of Search ............. 224/42.21, 42.24, 42.06, 224/42.08, 42.12, 42.23, 42.25, 42.28, 42.45 R, 273; 296/37.2; 414/463, 466; 248/291

[56] References Cited

U.S. PATENT DOCUMENTS

| 2,052,970 | 9/1936 | Erbeck | 414/466 |
| 2,348,811 | 5/1944 | Hartman | 414/466 |
| 2,701,670 | 2/1955 | Hutchinson | 224/42.24 |
| 2,765,091 | 10/1956 | Weiss | 414/466 |
| 3,365,084 | 1/1968 | Fernicola | 224/42.21 |
| 3,753,520 | 8/1973 | Bodde | 224/42.21 X |
| 3,865,291 | 2/1975 | Tidwell | 224/42.24 |
| 4,116,373 | 9/1978 | Bryngelson | 414/463 X |

Primary Examiner—Robert J. Spar
Assistant Examiner—Jerold M. Forsberg
Attorney, Agent, or Firm—Thomas M. Scofield

[57] ABSTRACT

A spare tire carrier for pick-up trucks; pivotable bracket and frame means fixed within a truck body or over a truck bed removably mounting a spare tire and carrying the tire either (alternatively) within the bed or outside the bed.

6 Claims, 8 Drawing Figures

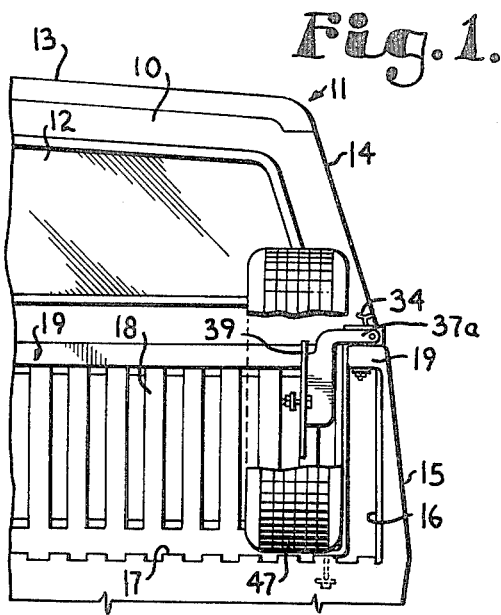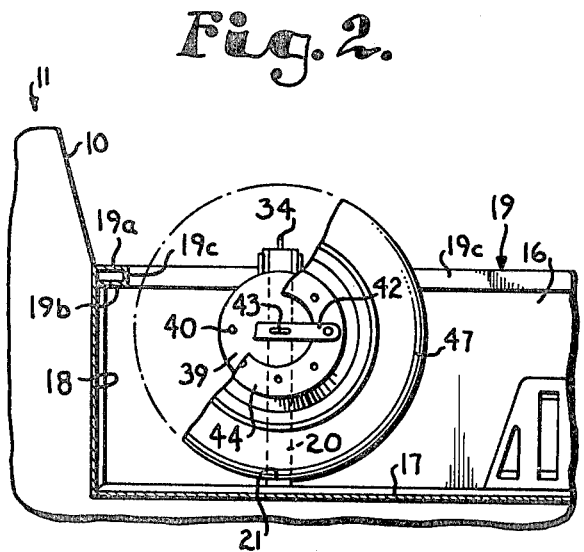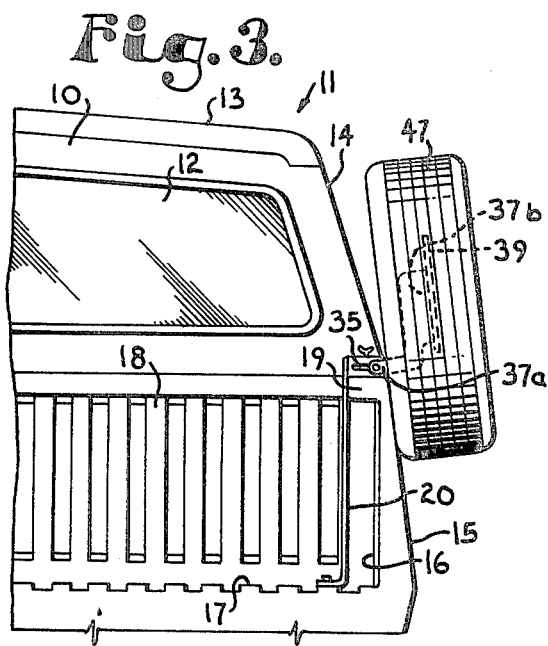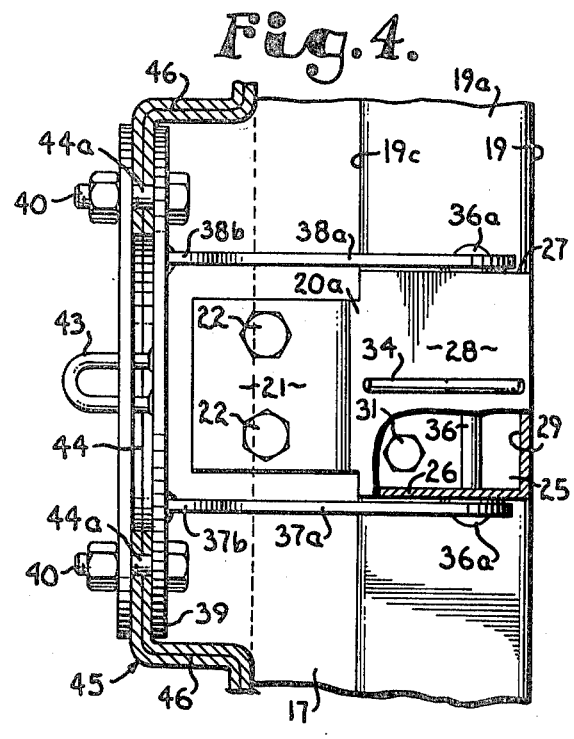

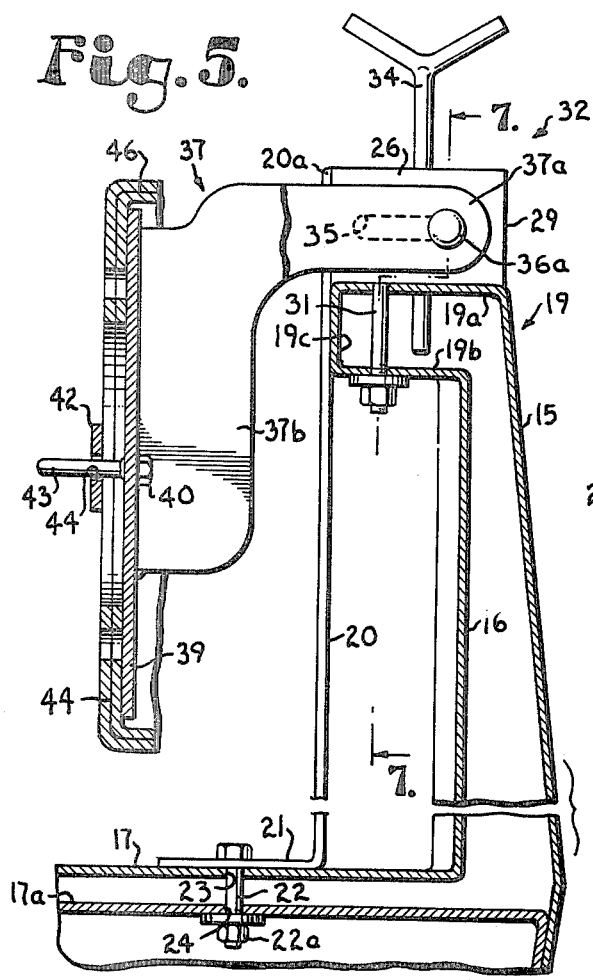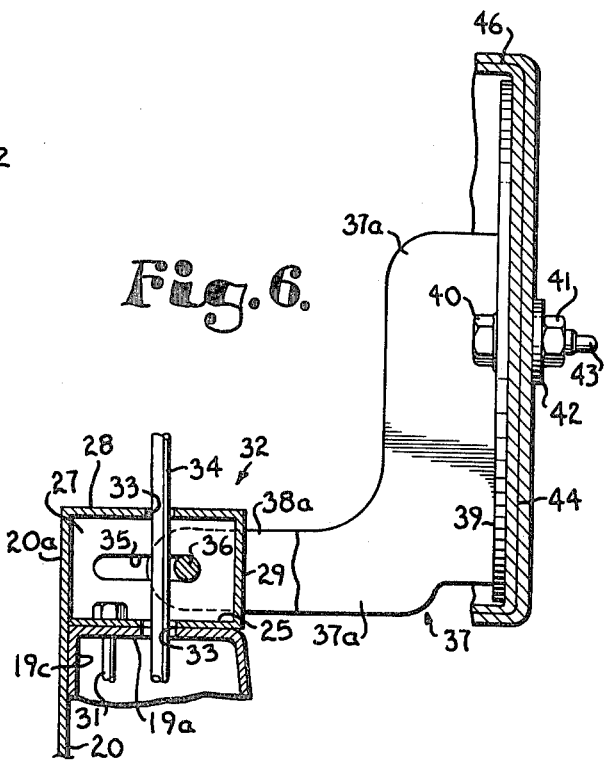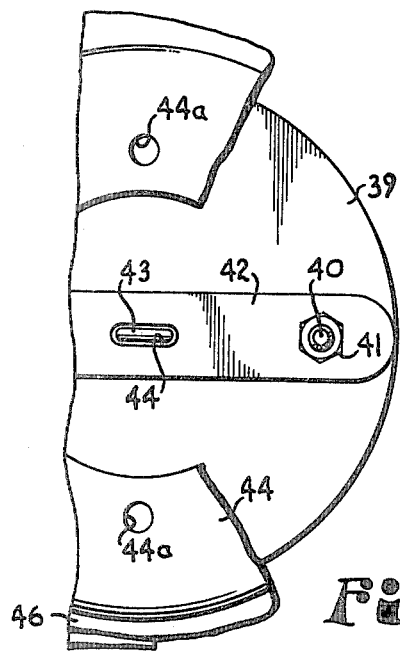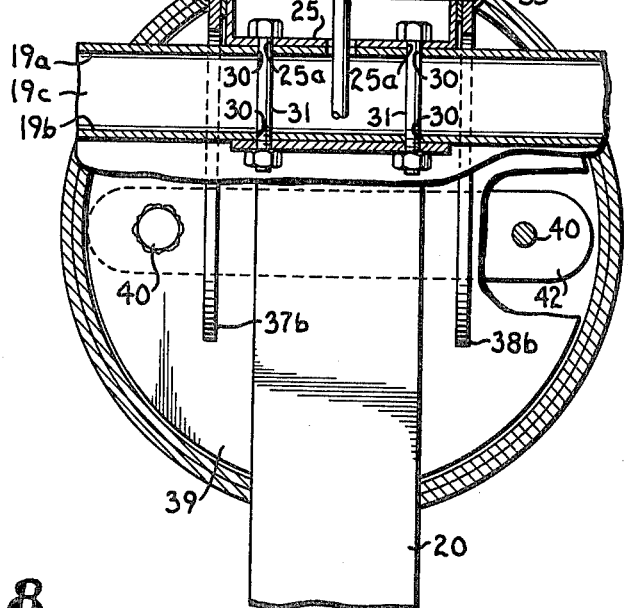

SPARE TIRE CARRIER FOR PICK-UP TRUCKS

SUMMARY OF THE INVENTION

This is a device for mounting and carrying a spare tire on a pick-up truck or like vehicle. Frame means are provided to safely and securely carry the tire vertically within the truck body or, alternatively, outboard thereof. One or more of the devices may be employed if circumstances require carrying of one or more spare tires. The alternative outboard carrying position operates to clear the entire truck body for work or load.

THE PRIOR ART

Applicant is aware of the following prior art related devices:

Erbeck U.S. Pat. No. 2,052,970 "Spare Wheel Or Tire Carrier," issued Sept. 1, 1936;

Norris U.S. Pat. No. 4,007,863, issued Feb. 15, 1977, for "Pick-Up Truck Spare Tire, Jack And Lug Wrench Holder;" and McCauley U.S. Pat. No. 4,013,230, issued Mar. 22, 1977, for "Lockable Tire Carrier".

BACKGROUND OF THE INVENTION

Devices are well known for removably securing spare tires along the side walls of pick-up trucks interior of the truck bed. The optimum position for securement of such spare tires is in a vertical position forward of the rear wheel wells and aft of the cab, with spacing such that the center and rear portion of the truck bed is free for carrying a load, loading and unloading. However, none of these prior art devices of which the author is aware provide any means for moving, pivoting or relocating the spare tire (when it is mounted on its carrying rack or device) so that the load area or truck bed of the pick-up truck may be entirely clear. Such clearance may be desired only for a short time, as in loading or unloading the truck. Alternatively, it may be necessary or desired to be able to transport the spare tire in the truck rear area, yet load the entire bed of the truck. With these known and conventional spare tire mounting devices for pick-up trucks, such usage and versatility is not known.

There is known in the older art of dump trucks and the like, means which permit, when the bed or body of the truck is empty, the tire to be carried within the body. In such case, when the truck is to be loaded, the tire is hinged upwardly. When the body is full, the tire and its supporting device lowered down onto the load. This prior art device is not practical for present day pick-up trucks. Additionally, more often than not, the loading of the rear end of a pick-up truck would not permit the return of the spare tire onto the load because of its character or nature. What is desired is a device which will securely mount a spare tire normally within the confines of the rear truck bed of a pick-up truck, yet, when it is necessary to use the entire bed of the truck, permit the translation or pivoting of the spare tire to a position outboard of the truck bed, yet securely mounting the tire for safe riding, where both the full advantages of the truck structure and the spare tire mounting structure are available to the vehicle owner. A device permitting such usage is not presently available to the public and such is the thrust and purpose of the instant invention and development.

OBJECTS OF THE INVENTION

A first object of the invention is to provide a spare tire carrier for a pick-up truck which embodies numerous improvements over the known devices.

Another object of the invention is to provide a device for removably mounting a spare tire within a pick-up truck body so that the tire is normally carried vertically, in such manner as to offer minimum blockage of the work and loading space of the truck body and bed.

Another object of the invention is to provide such an improved spare tire carrier for a pick-up truck body wherein, if it is desired or necessary to utilize the entire floor, bed or loading volume of the pick-up truck, the spare tire may be swung outboard of the pick-up truck body in a near vertical, yet secure, carrying position for the tire.

Another object of the invention is to provide an improved mounting and handling means for the spare tire of a pick-up truck wherein the tire may be carried in one of two alternative positions: (1) The first position vertical at the side of the truck body within the bed, (2) the second outboard of the truck body and bed in near vertical carrying position.

Another object of the invention is to provide a novel spare tire mounting and handling device for a pick-up truck which provides, at all times, a powerful, secure mounting for the tire, stable with respect to the truck, whether or not the truck body is fully loaded, partly loaded, or empty.

Another object of the invention is to provide tire carrier means for a pick-up truck which may be used singly or in pairs for one or more spare tires for the truck, the device, when used singly or in pairs, not interfering with the loading and unloading of the truck and always making the entire truck body available for loading, carrying and unloading, while at all times carrying the spare tires in accessible readiness.

Another object of the invention is to provide such a device which is extremely strong in use and operation, long lived, relatively simple in construction and which may readily be mass produced.

Other and further objects of the invention will appear in the course of the following description thereof.

DRAWINGS

In the drawings, which form a part of the instant specification and are to be read in conjunction therewith, an embodiment of the inventive construction is shown and, in the various views, like numerals are employed to indicate like parts.

FIG. 1 is a fragmentary view taken into the end of a pick-up truck, from the rear, on the right hand side, showing the subject tire mounting device mounted on and applied to the side and bottom walls of the truck bed, the tire inboard of the truck and portions of the tire cut away to better illustrate the structure of the subject device.

FIG. 2 is a fragmentary view of a portion of the forward end of the right inside of a pick-up truck bed, taken at right angles to the view of FIG. 1 and from the left in the view of FIG. 1, looking to the right in that view, showing a portion of the inside of the truck bed, the truck bed side wall and looking at the device and tire in the position of FIG. 1. Portions of the tire are cut away to better illustrate the structure of the device.

FIG. 3 is a view like that of FIG. 1, but with the tire pivoted to the outboard tire storage position.

FIG. 4 is a fragmentary plan view from above of the device when it is in the position of FIGS. 1 and 2 taken in a section through the tire immediately above the engagement of the device therewith and looking downwardly. The view is enlarged with respect to FIGS. 1 and 2.

FIG. 5 is an enlarged detail of the subject device with the tire mounting portion thereof in the position of FIGS. 1 and 2 (tire inboard of the truck bed), parts of the device cut away for better illustration of the structure thereof. This view is an enlargement of FIG. 1 without the tire per se being seen (its hub is).

FIG. 6 is a fragmentary view of the upper right hand portion of FIG. 5, taken in section, the tire carrying portion of the device positioned and locked in its outboard tire carrying position (like FIG. 3).

FIG. 7 is a view taken along the lines of 7—7 of FIG. 5 in the direction of the arrows.

FIG. 8 is a fragmentary detail of the engagement of the device with an automobile tire, with portions of the tire hub cut away to better illustrate the structure. This is an enlargement of the center of FIG. 2.

STRUCTURE AND FUNCTION

Referring to the drawings, portions of a conventional pick-up truck body and bed are seen therein, fragmentarily. The rear wall 10 of the cab 11 typically has window 12 therewithin. The roof of the cab is indicated at 13 and the right hand side thereof (viewed from the rear) is seen at 14.

With respect to the body or load carrying portion of the pick-up truck, there is seen the right hand side wall 15 (outside thereof), the inside right side wall 16, the truck floor or bed 17 and the front wall 18. Typically, the inside pick-up truck body is corrugated as may be seen on the floor or bed, front wall and side wall. Around the three defining walls of the pick-up truck body, there conventionally and typically runs a shelf or flange 19, the typical sectional construction of which may be seen in detail in FIGS. 2 (front wall) and 5 (side wall). From the top of the corrugations in bed 17 (or the bed itself if it is flat), the height to the top surface of shelf 19 is typically 19 inches. It may be greater or less in any given truck, in which case the height of the device to be described will necessarily have to be changed. The width of the top surface of flange 19, that is, referring to FIG. 5, panel 19a, is typically two and one half to three inches. The lower panel 19b of shelf 19 is spaced downwardly, typically, 1-3 inches, from upper panel 19a, the two panels being joined at their inboard end by normally vertical facing panel 19c. In pick-up truck construction, the double wall sidewall construction seen at 19b and 16 may be absent (only walls 15, 19a and 19c). In such case bolts 31 are merely much shorter.

Turning to the device itself, an elongate vertical strap 20 has a foot portion 21 at the bottom thereof extending at right angles thereto which overlies the bed or floor of the truck 17 and may be fixed thereto by a bolt 22 and nut 22a, which bolt extends through openings 23 and 24 in floor or bed panels 17 and 17a. A washer may be employed as seen in FIG. 5 at the lower connection.

The upper end 20a of strap 20 extends vertically past panel 19a of shelf 19. Welded or otherwise fixedly attached thereto is a rectangular box member having (FIGS. 6 and 7) bottom wall 25, side walls 26 and 27, top wall 28 and outer end wall 29 (outboard). Bottom wall 25 has openings or holes 25a therethrough matching openings or holes 30 in panels 19a and 19b of shelf 19. Bolts 31 engage openings 25a and 30 to fix the box like structure described (generally designated 32) on the upper surface of shelf 19 at 19a. Thus, strap 20 is rigidly fixed with respect to the bed or floor 17 by bolt 22, lies flush against panel 19c of shelf 19 and is bolted to panel 19a of shelf 19 by bolts 31.

Openings (FIG. 6) 33 are provided in top and bottom walls 28 and 25 of box 32 to receive locking member 34 removably therethrough. An opening (not seen) may be drilled through panel 19a to match lower opening 33 if it is desired to extend the locking means to be described into the shelf 19. Such is preferable.

Paired slots 35 are provided in walls 26 and 27 of box 32, whereby to receive shaft 36 therewithin. Shaft 36 has enlarged heads 36a on the ends thereof.

A pair of generally L-shaped arms, designated 37 and 38, are provided having base portions 37a and 38a fixed to shaft 36 and outer portions 37b and 38b extending at right angles to portions 37a and 38a, respectively. Fixed to the outer sides of portions 37b and 38b is circular plate 39. Threaded bolts 40, having nuts 41 thereon, pass through openings in plate 39 and removably engage smaller plate 42 which is long enough to engage the sides of the center portion of a tire hub. U-shaped member 43 engages slot 44 in plate 42 for strengthening purposes, as well as weight carrying purposes with respect to the tire hub engagement. Bolts 40 are welded or otherwise fixedly attached to plate 39 as is member 43.

The center flange members 44 of a tire hub generally designated 45 have integral with or fixed thereto the axially extending members 46 (axial with respect to the tire itself) which in turn are connected to the portion of the tire hub carrying tire 46 itself. This construction is standard and is not seen in full detail (save with respect to FIG. 2). Bolts 40 engage the openings 44a (FIG. 4) in the tire hub flange portion 44 that those bolts that hold the wheel onto the axle engage when the tire is placed on the car.

In order to give a good concept of scale, dimensions of the device will be given. These are accurate for the device applied in a truck body where the height, from the top of panel 19a to the bed or floor 17 is substantially 19 inches. These dimensions may be varied as required as the truck bed dimensions vary. The length of walls 25 and 28 is 4 inches. The width thereof is 3 inches. The width of strap 20 is 3 inches. The height of walls 26 and 27 is slightly over 2 inches. The length of slots 35 is substantially 2 inches. The length of arms of 37 and 38, specifically in the portions 37a and 38a out to plate 39, is approximately 6 inches. The diameter of plate 39 is 9 inches. All parts are preferably made of steel for sufficient strength.

OPERATION

Description of the operation of the device starts from the positions of FIGS. 1, 2, 5 and 7, specifically, with the tire mounting portion of the device inboard of the truck bed or truck body. In such case, arm portion 37a and 37b are substantially horizontal and shaft 36 is at the outboard ends of slot 35 in walls 26 and 27 (to the right in FIGS. 1, 4 and 5). Pin or holding member 34 engages the openings in walls 28 and 25 and, preferably, a matching opening in panel 19a. Thus it may be seen that the entire pivotable portion of the mounting and the tire itself is inboard of the outer side wall 15 of the truck.

In order to have access to the entire truck body and bed, the device is moved to the position of FIGS. 3 and 6, where the tire and tire mounting portion of the device are outboard of wall 15.

To accomplish this, the operator climbs into the truck bed, pulls out pin 34 and raises the tire in an arc around shaft 36 in slot 35. The tire moves substantially 180° to the position of FIG. 3 (slightly less) so as to ride against the slightly outwardly angled side of the device. Alternatively, the translation could be a full 180° to a substantially vertical position of the tire. The arm portions 37a and 38a move 180° from the substantially horizontal position of FIG. 5 to the substantially horizontal position of FIG. 6 with the portions 37b and 38b, which were substantially vertical downwardly, substantially vertical upwardly but at the outboard position.

During the pivotal translation, shaft 36a may move in the slot as required in the heaving over of the tire by the operator. However, when the tire is in the position of FIG. 3 (device in position of FIG. 6), shaft 36 is again at the outboard portion of the slot 35. Pin 34 may be replaced (as seen in FIG. 6) to maintain shaft 36 in the outboard portion of slots 35. The tire rides stable in this position, independent of bumps, jolts, angling or the like. I have discovered that pin 34 is not necessary except under very unusual conditions but I provide it for greater stability, strength and safety in the device under all conditions.

In very unusual circumstances, such as in extraordinarily narrow going, the tire could be positioned in a normally horizontal position over the load in the truck body. This would be extremely unusual and pin 34 could be put in position to lock shaft 36 in the inboard portion of slots 35 to hold the tire and mounting means as far inboard as desired.

In order to return the tire and device to the positions of FIGS. 1, 2, 4, 5, and 7, the operator removes pin 34, reaches out and graspbs the top of the tire in the position of FIG. 3, then tilts the tire top inboard over its pivot around shaft 36 down and into the position of FIG. 1, etc. At this point, the pin 34 is replaced in the position seen in FIGS. 4 and 5.

When it is desired to remove the tire from plate 39, such removal is preferably undertaken in the position of FIG. 1. However, it may be done from the position of FIGS. 3 and 6 if the bed load is full. The blown out tire or replaced tire is then mounted on plate 39, with tire hub, then plate 42 is placed against the outer face of the hub members and bolts 41 fastened.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown is the accompanying drawings is to be interpreted as illustrative and not in a limiting sense.

I claim:

1. A device for mounting a vehicle wheel and tire assembly on the side wall of a pick-up truck bed, the pick-up truck bed having a normally horizontal floor, normally vertical side walls at the side edges of the floor and a normally horizontal rim at the top edge of the side walls comprising, in combination:

a normally vertical beam member having a lower end portion adapted to overlie and be connected to the truck bed floor and of sufficient height to extend above the top of the side wall top edge rim, a substantially rectangular tube section having upper, lower and side walls connected at one edge thereof to one side face of the upper end of said beam member and projecting laterally therefrom in such manner as to overlie the side wall top edge rim with the lower wall thereof, means for connecting the beam member lower end portion to the truck bed floor, means for connecting the lower wall of the tube section to the side wall top edge rim, a pair of L-shaped arms pivotably mounted on one end thereof on a shaft rotatably received in opposed openings in the side walls of the tube section, a flat circular plate fixed by one face thereof to the edges of the L-shaped arms not connected to the said shaft, and means on the other face of the plate for securing the center portion of a car wheel to said plate, said circular plate, when a car wheel with a tire is mounted thereon, movable from a first, normally vertical, down position within said truck bed to a second, normally vertical, up position outside and above said truck bed by pivoting said arms on said shaft, the openings in the side walls of the tube section being paired, elongate slots and means for alternately confining the shaft next to each end of said slot.

2. A device as in claim 1 wherein the confining means comprises opposed openings in the top and bottom walls of the tube section positioned intermediate the ends of the said slots and a pin for extending through and engaging the said top and bottom walls.

3. A device for mounting a vehicle wheel and tire rim assembly on the side wall of a pick-up truck bed, the pick-up truck bed having a normally horizontal floor, normally vertical side walls at the side edges of the floor and a normally horizontal rim at the top edge of the side walls, comprising, in combination:

a normally vertical beam member having a lower end portion adapted to overlie and be connected to the truck bed floor and of sufficient height to extend above the side wall top edge rim, a body member connected at one edge thereof to one side face of the upper end of said beam member and projecting laterally therefrom in such manner as to overlie at least a portion of the side wall top edge rim, means for connecting the beam member lower end portion to the truck bed floor, means for connecting the body member to the side wall top edge rim, an L-shaped arm pivotably mounted at one end thereof on a shaft rotatably received in said body, a plate fixed by one face thereof to the leg of the L-shaped arm not connected to the said shaft, and means on the other face of the plate for securing the center portion of a tire rim to said plate, said plate, when a tire rim with a tire is mounted thereon, movable from a first, normally vertical, down position within said truck bed to a second, normally vertical, up position outside and above said truck bed by pivoting said arm on said shaft, and said shaft being slidably movable within said body and means for alternately confining the shaft at a plurality of positions with respect to said body.

4. A device for mounting a vehicle wheel and tire rim assembly on the side wall of a pick-up truck bed, the pick-up truck bed having a normally horizontal floor, normally vertical side walls at the side edges of the floor and a normally horizontal rim at the top edge of the side walls, comprising, in combination:

a frame rigidly connected to the rim at the top edge of one of the side walls of said pick-up truck bed, a plate removably connected to the center portion of a vehicle wheel and tire rim assembly, an L-shaped arm connected by one leg of the L to one side of said plate and, adjacent the free end of the other leg of the L, pivotably to said frame, whereby said plate is movable from a first, normally vertical down position within said truck bed with a leg of said L-shaped arm connected to said plate substantially vertically positioned downwardly within said truck bed, to a second, normally substantially vertical, up position outside and above said truck bed with the L-shaped arm leg connected thereto in a substantially vertical up position also outside and above said truck bed, by pivoting said arm at its connection with said frame substantially 180°, and the pivotable connection of said arm to said frame slidable within said frame so that said plate may be laterally translated with respect to said frame, as well as pivoted therearound and means for securing said pivotable mounting in a plurality of positions with respect to said frame.

5. A device as claim 4 including a normally vertical beam member having a lower end portion adapted to overlie and be connected to the truck bed floor and of sufficient height to extend above the top of the side wall top edge rim, said beam member connected to said frame.

6. A device as in claim 4 including two L-shaped arms connected to said plate and pivotably connected to said frame, the latter connection by shaft engaging said arms and said frame.

* * * * *